UNITED STATES PATENT OFFICE.

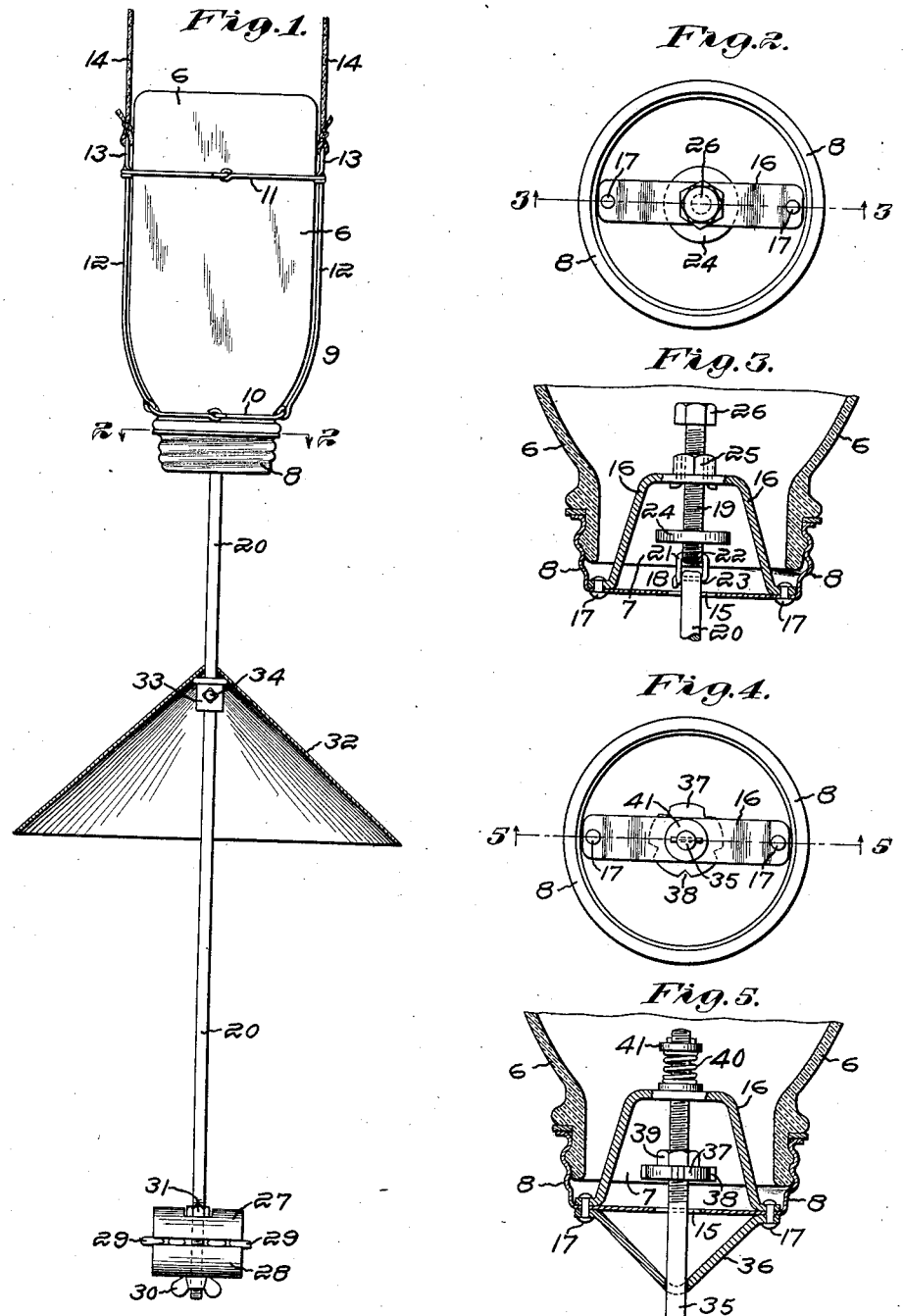

ANDREW H. BAKER, OF BROCKTON, MASSACHUSETTS.

POULTRY FEEDER AND EXERCISER.

1,094,110.  Specification of Letters Patent.  Patented Apr. 21, 1914.

Application filed July 21, 1913.  Serial No. 780,158.

*To all whom it may concern:*

Be it known that I, ANDREW H. BAKER, a citizen of the United States, and a resident of Brockton, county of Plymouth, and State of Massachusetts, have invented an Improvement in Poultry Feeders and Exercisers, of which the following description, in connection with the accompanying drawings, is a specification, like characters on the drawings representing like parts.

This invention relates to poultry feeders, and more particularly, though not exclusively, to poultry feeders and exercisers of that class in which some effort is necessary on the part of the poultry to disturb or agitate the feed in the hopper, and cause it to drop onto the ground, where it may be picked up.

My invention will be best understood by reference to the following specification, when taken in connection with the accompanying drawings of two illustrative embodiments thereof, while its scope will be more particularly pointed out in the appended claims.

In the drawings: Figure 1 is an elevation of one form of poultry feeder and exerciser embodying my invention; Fig. 2 is a plan section on an enlarged scale on line 2—2 of Fig. 1; Fig. 3 is a section on line 3—3 of Fig. 2; Fig. 4 is a plan section of a modification of the feeder shown in Figs. 1 to 3, inclusive; and Fig. 5 is a sectional view on line 5—5 of Fig. 4.

Referring to the drawings, and to the embodiments of my invention which I have selected for illustrative purposes, I have there shown a poultry feeder comprising a hopper 6, which may be and preferably is in the form of an inverted glass jar, having a mouth 7 provided with a cap or cover 8, attached to the jar in any appropriate manner, as for example by being threaded onto the same. The jar may be supported in any other suitable manner, but is herein provided with a wire frame 9, having a collar 10 encircling the neck portion of the jar, and a collar 11 encircling the body portion of the jar, and connected to the collar 10 by a pair of longitudinal members 12, herein provided with eyes 13. A pair of cords 14, attached to these eyes, may extend vertically therefrom, and may be attached to any appropriate support (not shown). By this means, the hopper may be conveniently refilled from time to time, by turning the mouth upward and removing the cap.

The cap 8 is herein provided with an opening 15, preferably located centrally therein, and serving as an exit for the feed. The latter may be controlled by any other appropriate means, but herein there is secured to the cover a suitable support, preferably in the form of a yoke 16 within the hopper above the exit opening, and extending across the latter, said yoke having its terminal portions secured to the cap in any appropriate manner, as by means of rivets 17. This yoke may serve as the support for appropriate agitating means, whereby the feed is agitated and caused to drop through the exit opening.

In the embodiment shown in Figs. 1, 2 and 3, the agitating means comprises a rod designated generally by the numeral 18, supported on the yoke and depending therefrom through the exit opening 15. Preferably, this rod is articulated, or jointed,— that is to say, it comprises an upper member 19 and a lower member 20, connected to each other by appropriate means permitting the lower member to move laterally with relation to the upper member. Preferably this connection is such that the lower member is capable of swinging laterally in all directions with relation to the exit opening 15. To this end, the two parts are connected to each other by a link 21, which may be, and preferably is, in the form of an eye made of wire, passing loosely through a hole 22 in the upper member, and a hole 23 in the lower member, these holes being made sufficiently large so that there is perfect freedom of movement of the lower member in all directions, and the link constitutes a simple form of universal joint.

In order to prevent too great freedom of movement of the feed toward the exit opening, I may provide any appropriate baffle, but herein a plate 24 is placed above the exit opening, and is substantially wider than the latter. Preferably, also, the plate is of the same general shape, but is greater in area than the opening. As a means for varying the delivery of the feed, the plate 24 is preferably adjustable vertically, and to that end is secured to the member 19, while the latter is threaded into a nut 25 secured to the support 16. The member 19 may be provided with an appropriate head 26 to facilitate turning the same in its nut, but it is not essential to employ this head for such purpose, since the threaded member may be conveniently rotated by grasping the external portion of the member 20. It will now be evident that if the plate 24 were to be adjusted toward the exit opening 15, such adjustment would tend to restrict the outlet, and diminish the quantity of feed distributed onto the ground, while on the other hand, if the plate were to be adjusted upwardly, a freer escape of the feed would naturally follow.

By placing the baffle above the opening and by jointing the rod between the baffle and opening, the restriction of the opening is not altered by the swinging of the rod but the regulation of the feed is uniform and the feed is discharged from the opening and distributed about the ground. In other words, the baffle, at all times during the operation of the feeder, bears a fixed relation to the opening regardless of the movements of the agitator, and a uniformly regulated discharge of the feed is assured, this being a feature of considerable practical importance. If, now, some means were to be provided for causing the depending member 20 to be swung laterally to and fro, the feed located adjacent and above the opening 15 will become disturbed or agitated, and thereby caused to dribble through the opening onto the ground. To this end, the rod 20 is extended an appropriate distance below the hopper, and is provided with an appropriate body which the poultry will peck at. This body may be of any other appropriate character, but herein the lower terminal portion of the rod passes through a pair of blocks 27 and 28, between which several kernels of corn, or grains of other suitable feed, 29 are clamped, by means of a nut 30 threaded onto the rod. A second nut 31, threaded onto the rod, may serve as an abutment for the upper block 27.

The described body at the bottom of the rod constitutes what is familiarly known in the art as a bait, which the fowls will peck at, and will in time learn to move laterally to cause the feed to descend from the hopper onto the ground. It will be observed that, owing to the mode of suspending the rod, no matter from what direction the poultry peck at the bait, the rod will be swung, and the feed in the hopper agitated and caused to drop through the exit opening. The descending feed may be spread laterally and distributed about the surface of the ground by any other appropriate means, but I prefer to employ a deflector 32 of generally conical form, whose apex is perforated to receive the rod 20, while the latter is provided with an adjustable collar 33, having a set screw 34, by means of which the deflector may be fixed at a suitable height on the rod. The descending feed, falling upon the apex of the cone, is deflected laterally in all directions, and scattered about the ground. By placing the deflector upon the laterally moving rod, it is caused to sway to and fro with the latter, and thereby scatter the feed with greater effect upon the surface of the ground.

Referring now to the modification shown in Figs. 4 and 5, this embodiment is similar in most respects to that already described, with the exception that it is provided with a rod 35 mounted to rotate in a bearing provided in the yoke 16, and a bearing provided in a second yoke 36 secured to the cap of the hopper. In this case, the rod is intended to be rotated by the poultry, and I have therefore provided a suitable agitator in the form of a plate 37 secured to the rod, and having suitable means, as for example a series of notches 38, for disturbing or agitating the feed, and causing the same to dribble through the exit opening. This plate may be fixed upon the rod by threading it onto the latter, and by providing a lock-nut 39, also threaded onto the rod, whereby the plate may be fixed in the desired position of adjustment.

If desired, the rod and agitator may be mounted to move vertically, and to that end may be supported upon an appropriate spring, herein a helically coiled spring 40, encircling the rod, bearing at its upper end against a collar 41 secured to the rod, and resting at its lower end upon the yoke 16. By mounting the rod in this fashion, the pecking of the poultry against the bait will naturally cause the rod to dance up or down, as well as to rotate, and will furnish an efficient means for causing the feed to descend.

While I have herein shown and described two specific embodiments of my invention for illustrative purposes, and have disclosed and discussed in detail the construction and arrangement incidental to two specific applications thereof, it is to be understood that the invention is limited neither to the mere details or relative arrangement of parts, nor to its specific embodiments herein shown, but that extensive deviations may be made from the illustrative forms or embodiments of the invention, without departing from the principles thereof.

Having thus described my invention, what I claim and desire by Letters Patent to procure is:

1. A poultry feeder and exerciser comprising, in combination, a hopper having an exit opening in its bottom, a jointed rod depending through and having its joint above said opening, and a member secured to and projecting laterally from said rod above said joint.

2. A poultry feeder and exerciser comprising, in combination, a hopper having an opening in its bottom, a cap for said opening, said cap having an outlet for the feed, means for supporting said cap, a support secured to said cap adjacent said opening, and agitating means supported by said support.

3. A poultry feeder and exerciser comprising, in combination, a hopper, a cap removably secured to the bottom of said hopper and provided with an exit opening, a support secured to said cap and extending therefrom upwardly into said hopper, and agitating means supported wholly by said support and removable from said hopper with said cap.

4. A poultry feeder and exerciser comprising, in combination, a hopper provided with an exit opening in its bottom, a yoke extending across said opening within said hopper, and having a fixed nut, a rod threaded into said nut, a baffle secured to said rod, and agitating means including a rod supported on the first mentioned rod and depending through said opening.

5. A poultry feeder and exerciser comprising, in combination, a hopper having a mouth at its bottom, a cap for said mouth provided with a exit opening, a support mounted on said cap having a generally U-shaped form and projecting from said cap upwardly into said hopper, agitating means including a rod supported on said support and depending through said opening, and a body interposed between said support and said opening.

6. A poultry feeder and exerciser comprising in combination, a hopper, supporting means therefor, a cap having an exit opening and detachably attached to said hopper independently of the hopper supporting means, and agitating means supported by said cap.

In testimony whereof I have signed my name to this specification in the presence of two subscribing witnesses.

ANDREW H. BAKER.

Witnesses:
LOUIS A. JONES,
CLARA L. STUART.

Copies of this patent may be obtained for five cents each, by addressing the "Commissioner of Patents, Washington, D. C."